United States Patent
Greenberg

(10) Patent No.: US 7,825,989 B1
(45) Date of Patent: Nov. 2, 2010

(54) TELEVISION CHANNEL CHANGE PICTURE-IN-PICTURE CIRCUIT AND METHOD

(75) Inventor: Robert Y. Greenberg, Portland, OR (US)

(73) Assignee: Pixelworks, Inc., Portland, OR (US)

( * ) Notice: Subject to any disclaimer, the term of this patent is extended or adjusted under 35 U.S.C. 154(b) by 0 days.

(21) Appl. No.: 12/426,865

(22) Filed: Apr. 20, 2009

Related U.S. Application Data

(63) Continuation of application No. 11/190,216, filed on Jul. 26, 2005, now Pat. No. 7,532,253.

(51) Int. Cl.
*H04N 5/45* (2006.01)
*H04N 5/445* (2006.01)

(52) U.S. Cl. ............... 348/565; 348/564; 348/563; 348/567; 348/715

(58) Field of Classification Search .......... 348/565, 348/564, 563, 567, 715, 588; 725/38, 40, 725/43, 59; 345/545, 546, 547
See application file for complete search history.

(56) References Cited

U.S. PATENT DOCUMENTS

| | | | | |
|---|---|---|---|---|
| 5,557,338 | A | * 9/1996 | Maze et al. | 725/38 |
| 6,563,515 | B1 | * 5/2003 | Reynolds et al. | 715/721 |
| 6,611,260 | B1 | * 8/2003 | Greenberg et al. | 345/204 |

* cited by examiner

*Primary Examiner*—David L Ometz
*Assistant Examiner*—Jean W Désir
(74) *Attorney, Agent, or Firm*—Marger Johnson & McCollom, P.C.

(57) ABSTRACT

We describe and claim television channel change picture-in-picture circuit and method. The circuit includes means for displaying a first channel on a primary portion of a screen, means for changing from the first channel to a second channel, and means for displaying the second channel on a secondary portion of the screen responsive to the means for changing from the first to the second channel while continuing to display the first channel on the primary portion of the screen.

18 Claims, 5 Drawing Sheets

TELEVISION CHANNEL CHANGE PICTURE-IN-PICTURE CIRCUIT AND METHOD

CROSS-REFERENCE TO RELATED APPLICATION

This application is a continuation of U.S. patent application Ser. No. 11/190,216, filed on Jul. 26, 2005, titled TELEVISION CHANNEL CHANGE PICTURE-IN-PICTURE CIRCUIT AND METHOD, which is incorporated herein by reference in its entirety.

FIELD

This application relates to television systems and, more particularly, to a television channel change picture-in-picture circuit and method.

BACKGROUND

A typical television (TV) has a plurality of buttons to actuate associated features. One such feature is channel changing actuated by pressing a channel up or a channel down button on, e.g., a TV's remote control or front panel. The user presses the channel up or down button once for each channel up or down, respectively, he desires to view. Every time the user presses the channel up or down buttons, the channel displayed on the TV prior to the press is replaced with the currently selected channel. That is, the TV displays the currently selected channel with each channel up or down button press, no longer displaying previously selected channels.

FIGS. 1A-D are illustrations of a TV 160's display as the user changes selected channels. FIG. 1A is a display of the user's current channel 2 selection. After the user presses the channel up button once, the panel 160 replaces channel 2 with a display of channel 6 (FIG. 1B). After the user presses the channel up button again, the panel 160 replaces channel 6 with a display of channel 8 (FIG. 1C). After the user presses the channel up button yet again, the panel 160 replaces channel 8 with a display of channel 10 (FIG. 1D). And so on. After each channel change, the TV replaces display of the previous channel with a display of the current channel.

During channel surfing, the user scans a series of television channels to find something eye catching or to avoid commercials. It is desirable to channel surf without replacing the television's display of the currently selected channel at every channel change button press.

Accordingly, a need remains for a TV channel change picture-in-picture circuit and method.

BRIEF DRAWINGS DESCRIPTION

We describe embodiments referencing the following drawings.

FIGS. 1A-D are illustrations of a TV 160's display as the user changes channels.

FIGS. 4A-E are illustrations of a TV 160's display as the user changes channels using an embodiment of a TV channel change picture-in-picture circuit and method.

Figure 5:
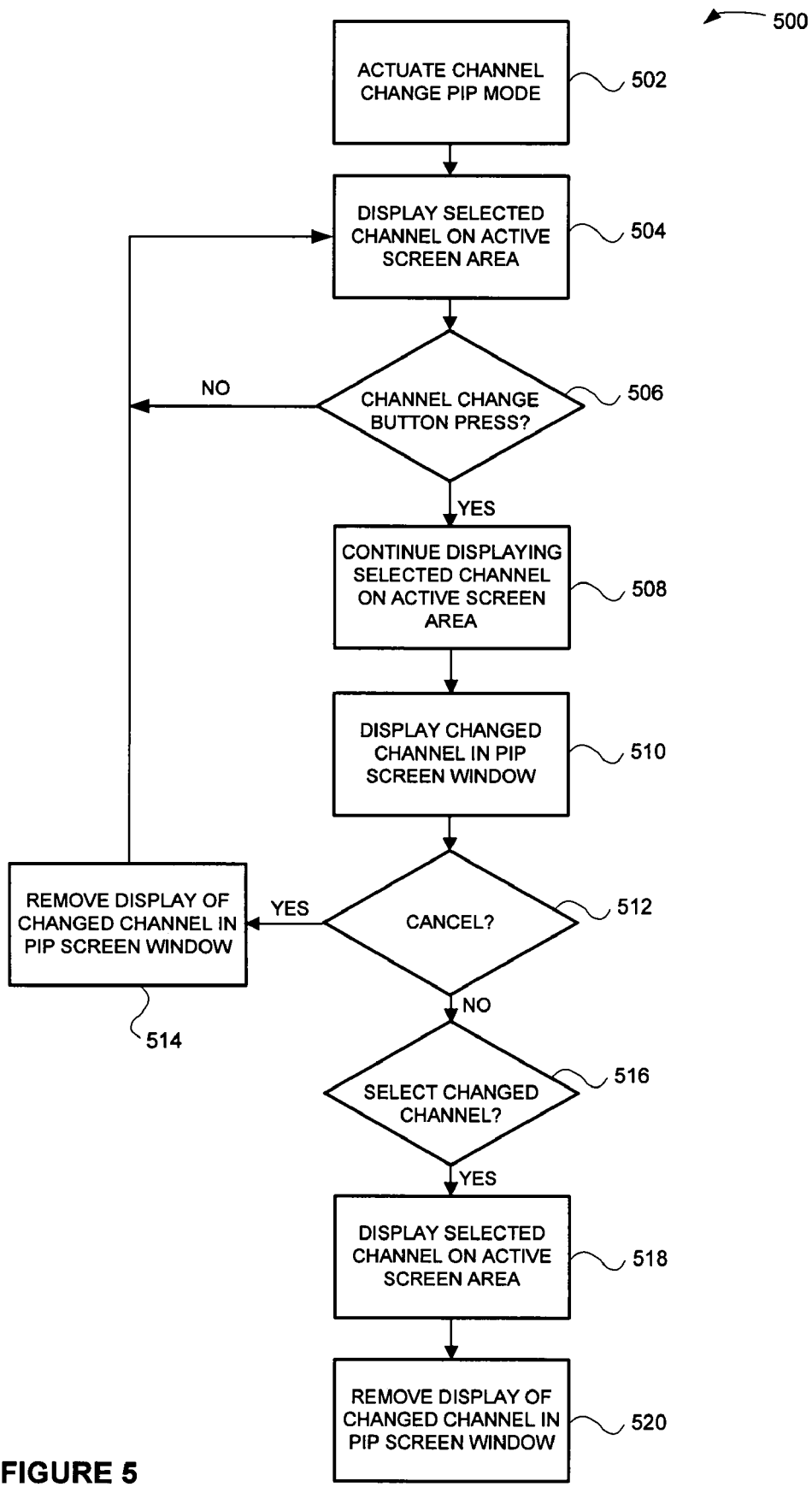

FIG. 5 is a flowchart of an embodiment of a channel change picture-in-picture method.

DETAILED DESCRIPTION

Figure 1A:
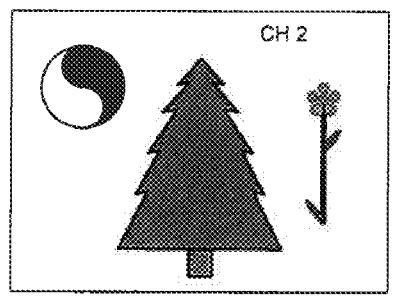
Figure 1B:
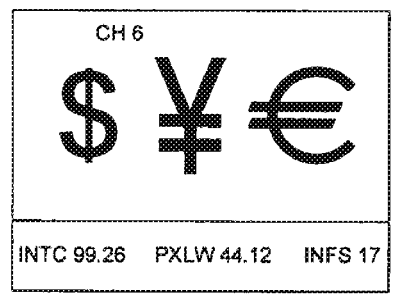
Figure 1C:
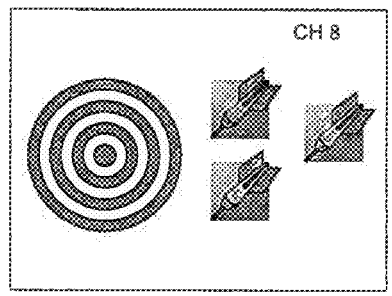
Figure 1D:
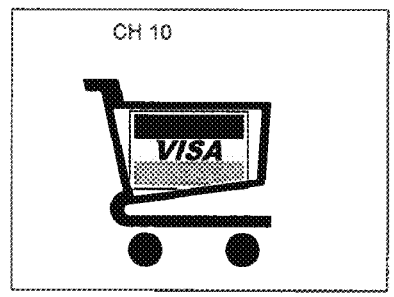
Figure 2:
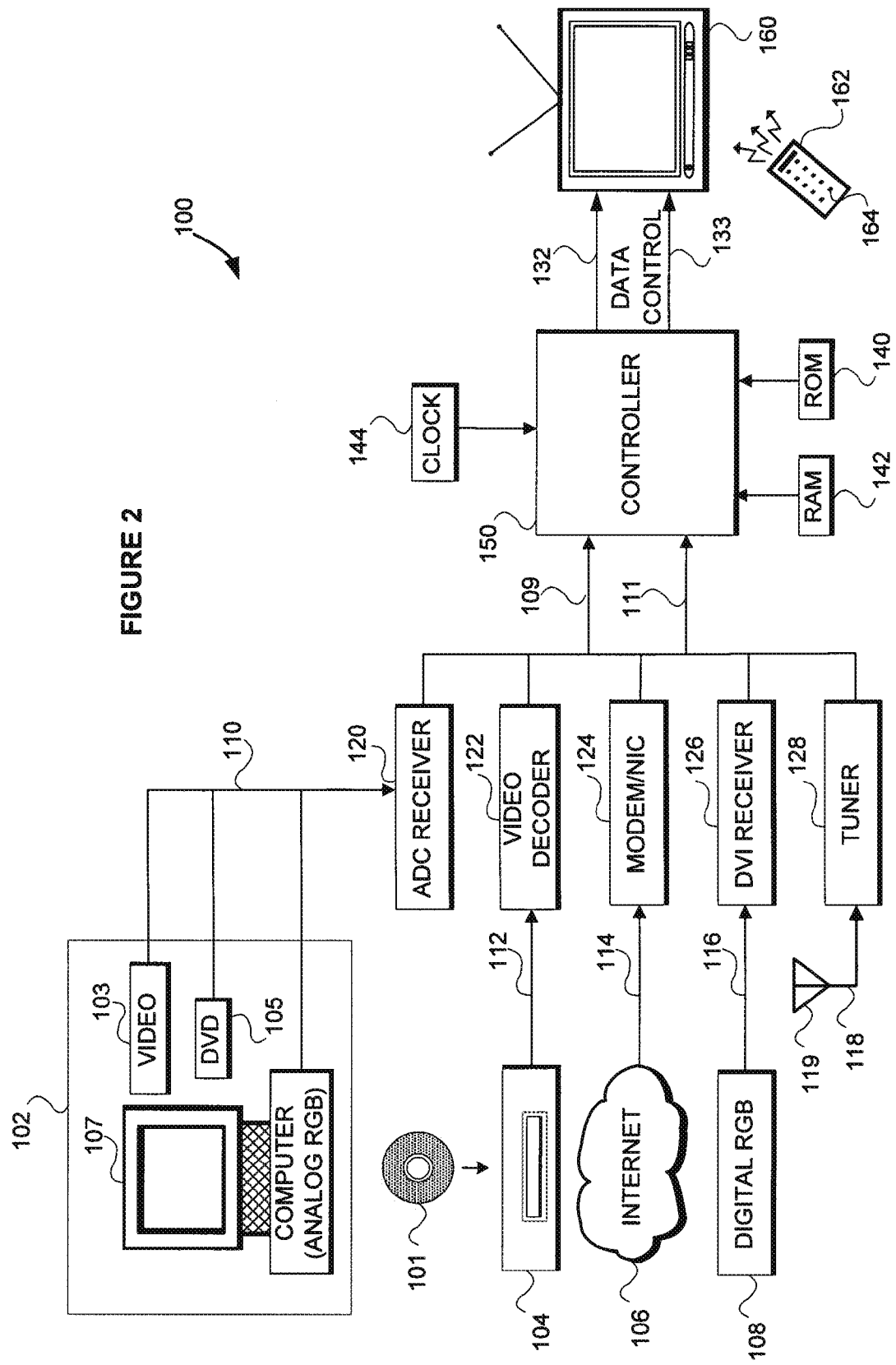
FIG. 2 is a block diagram of an embodiment of a television system 100.

FIG. 2 is a block diagram of an embodiment of a television system 100. Referring to FIG. 2, the system 100 includes a receiver 120 for receiving an analog image data signal 110, e.g., RGB or $YP_BP_R$ signal, from a source 102. The source 102 may be a personal computer 107, a digital video disk player 105, set top box (STB) 103, or any other device capable of generating the analog image data signal 110. The receiver 120 may be an analog-to-digital converter (ADC) or any other device capable of generating video signals 109 and/or 111 from the analog image data 110. The receiver 120 converts the analog image data signal 110 into the digital video signals 109 and/or 111 and provides it to a controller 150. A person of reasonable skill in the art knows well the design and operation of the source 102 and the receiver 120.

Likewise, a video receiver or decoder 122 decodes an analog video signal 112 from a video source 104. The video source 104 may be a video camcorder, tape player, digital video disk (DVD) player, or any other device capable of generating the analog video signal 112. The video source 104 may read (or play) external media 101. In an embodiment, a DVD player 104 plays the DVD 101. In another embodiment, a VHS tape player 104 plays a VHS tape 101. The decoder 122 converts the analog video signal 112 into the video signals 109 and/or 111 and provides it to the display controller 150. The decoder is any device capable of generating the video signals 109 and/or 111 in, e.g., Y/C or CVBS format, from the analog video signal 112. A person of reasonable skill in the art knows well the design and operation of the video source 104 and the video decoder 122.

A modem or network interface card (NIC) 124 receives data 114 from a global computer network 106 such as the Internet®. The data 114 may be in any format capable of transmission over the network 106. In an embodiment, the data 114 is packetized digital data. But the data 114 may also be in an analog form. Likewise, the modem 124 may be a digital or analog modem or any device capable of receiving and/or decoding data 114 from a network 106. The modem 124 provides video signals 109 and/or 111 to the display controller 150. A person of reasonable skill in the art knows well the design and operation of the network 106 and the modem/NIC 124.

A Digital Visual Interface (DVI) or high definition multimedia interface (HDMI) receiver 126 receives digital signals 116 from a digital source 108. In an embodiment, the source 108 provides digital RGB signals 116 to the receiver 126. The receiver 126 provides video signals 109 and/or 111 to the display controller 150. A person of reasonable skill in the art knows well the design and operation of the source 108 and the receiver 126.

A tuner 128 receives a wireless signal 118 transmitted by the antenna 119. The antenna 119 is any device capable of wirelessly transmitting or broadcasting the signal 118 to the tuner 128. In an embodiment, the antenna 119 transmits a television signal 118 to the television tuner 128. The tuner 128 may be any device capable of receiving a signal 118 transmitted wirelessly by any other device, e.g., the antenna 119, and of generating the video signals 109 and 111 from the wireless signal 118. The tuner 128 provides the video signals 109 and 111 to the controller 150. A person of reasonable skill in the art knows well the design and operation of the antenna 119 and the tuner 128.

The controller 150 may generate image data 132 and/or control signals 133 (collectively data signals 132) by manipulating the video signals 109 and 111 or any other signal it receives at its input. The display controller 150 provides the image data 132 to a panel 160 in any of a variety of manners. In an embodiment, the panel 160 is a television either analog (e.g., Cathode Ray Tube (CRT)), digital (e.g., High Definition Television (HDTV)), or otherwise. The panel 160 may be digital with a fixed pixel structure, e.g., active and passive LCD displays, plasma displays (PDP), field emissive displays (FED), electro-luminescent (EL) displays, micro-mirror technology displays, low temperature polysilicon (LTPS) displays, and the like. The panel 160 may be other than a digital display, e.g., an analog display such as a CRT as used in monitors, projectors, personal digital assistants, and other like applications. For simplicity, we refer to panel 160 as television 160 in the following description.

In an embodiment, the controller 150 may scale the video signals 109 and/or 111 for display using a variety of techniques including pixel replication, spatial and temporal interpolation, digital signal filtering and processing, and the like. In another embodiment, the controller 150 may additionally change the resolution of the digital video signal 109, changing the frame rate and/or pixel rate encoded in the video signals 109 and/or 111. We will not discuss scaling, resolution, frame and/or pixel rate conversion, and/or color manipulation in any further detail. A person of reasonable skill in the art should recognize that the controller 150 may manipulate the signals 109 and/or 111 and provide the image data 132 to the television 160 such that it is capable of properly displaying a high quality image regardless of display or panel type.

Read-only (ROM) and random access (RAM) memories 140 and 142, respectively, are coupled to the display system controller 150 and store bitmaps, FIR filter coefficients, and the like. A person of reasonable skill in the art should recognize that the ROM and RAM memories 140 and 142, respectively, may be of any type or size depending on the application, cost, and other system constraints. A person of reasonable skill in the art should recognize that the ROM and RAM memories 140 and 142, respectively, are optional in the system 100 and may be external or internal to the controller 150. RAM memory 142 may be a flash type memory device. Clock 144 controls timing associated with various operations of the controller 150.

The video signals 109 and/or 111 may be in a variety of formats, including composite or component video. Composite video describes a signal in which luminance, chrominance, and synchronization information are multiplexed in the frequency, time, and amplitude domain for single wire transmission. Component video, on the other hand, describes a system in which a color picture is represented by a number of video signals, each of which carries a component of the total video information. In a component video device, the component video signals may be processed separately and, ideally, encoding into a composite video signal occurs only once, prior to transmission. The video signals 109 and/or 111 may be a stream of digital numbers describing a continuous analog video waveform in either composite or component form. FIG. 2 describes a variety of devices (and manners) in which the video signals 109 and/or 111 may be generated from an analog video signal or other sources. A person of reasonable skill in the art should recognize other devices for generating the video signals 109 and/or come within the scope of the application.

In FIG. 2, the controller 150 is shown as receiving the video signals 109 or 111, or both. Alternatively, the controller 150 may receive an analog signal, e.g., analog image data signal 110 from the video 103, DVD 105, and/or computer 107. In the later case, the controller 150 may include means for receiving and converting the analog signal into a digital signal, e.g., ADC receiver 120 or video decoder 122.

Figure 3:
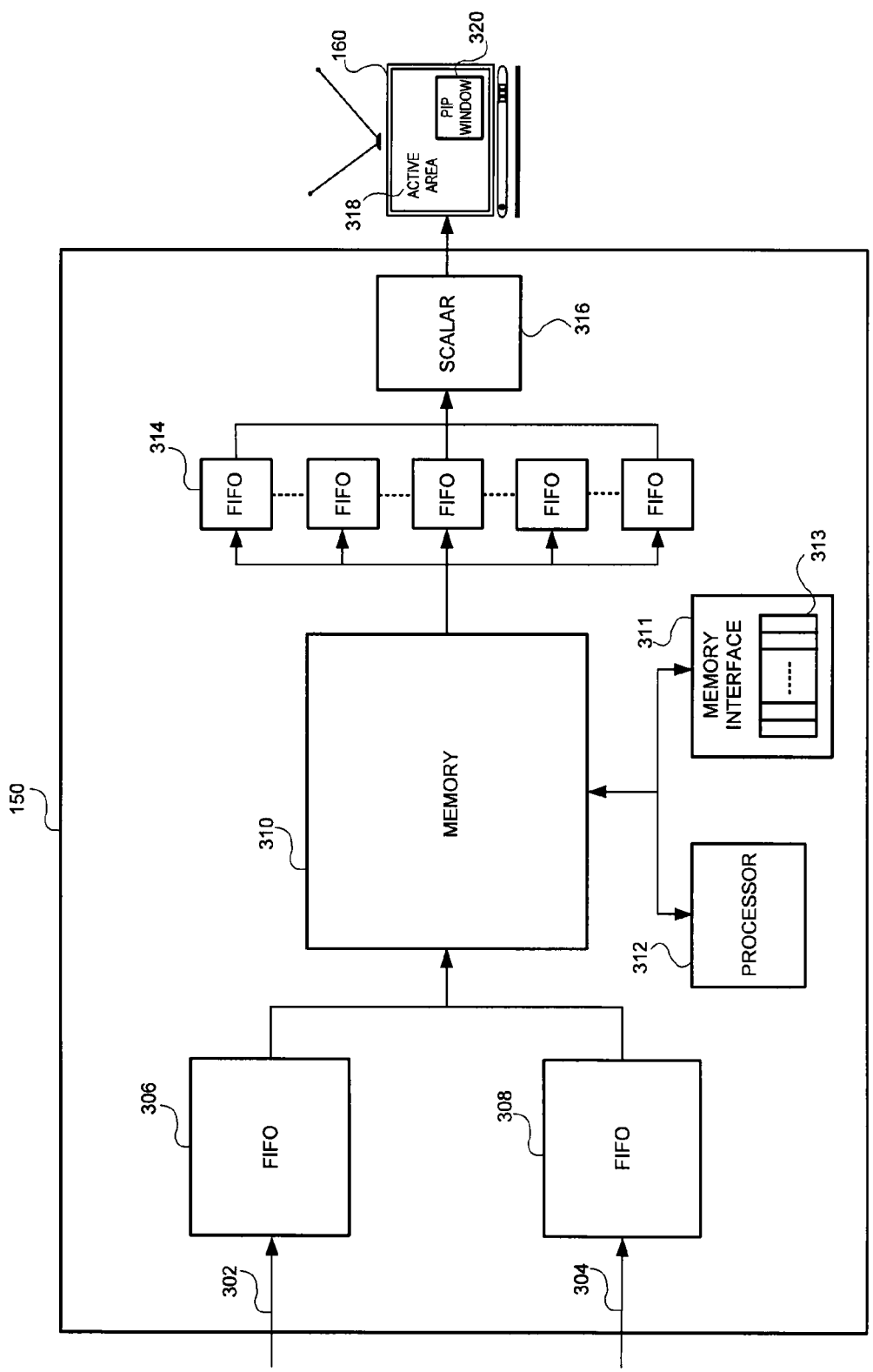
FIG. 3 is a block diagram of an embodiment of the controller 150 shown in FIG. 2.

FIG. 3 is a block diagram of an embodiment of the controller 150 shown in FIG. 2. The following description is associated with one embodiment of implementing PIP on a television system 100. But embodiments described below are capable of implementation in other PIP systems and methods. All PIP systems and methods known to a person of skill in the art come within the scope of the recited claims.

Referring to FIGS. 2 and 3, the controller 150 may capture signals 109 and 111 alternately or concurrently from at least two ports 302 and 304. We show only two ports 302 and 304 for simplicity but a person of reasonable skill in the art should understand that any number and type of ports come within the scope of the claims. In an embodiment, the ports 302 and 304 receive broadcast video signals for display on the television 160.

The controller 150 may capture signal 109 into a corresponding input buffer 306 from the port 302 while it captures signal 111 into a corresponding input buffer 308 from the port 304. In an embodiment, the input buffers 306 and 308 accumulate data pixels from signals 109 and 111, respectively, until the processor 312 indicates to a memory interface 311 that it can store them to a frame memory 310. The memory interface 311 may control the input buffers 306 and 308 and/or the frame memory 310 responsive to the processor 312.

The memory interface 311 may include a plurality of registers 313. The plurality of registers 113, in turn, may include a picture-in-picture (PIP) enable register (PIPEN) that is automatically set by the processor 312 or manually set by a user or manufacturer. When the PIPEN register is set, the controller 150 may concurrently capture data from the ports 302 and 304. The controller 150 may place data from one port, e.g., port 302, into a PIP window 320 while placing data from another port, e.g., port 304, in the active area 318 of the television 160.

A PIP source register (PIPSRC) may indicate which port can write to the PIP window 320. For example, if the PIPSRC is set to 1, the port 302 writes to the PIP window 320. And, for another example, if the PIPSRC is set to 0, the port 304 writes to the PIP window 320. Doing so defines what is displayed on an active area 318 and on a PIP window 320 of the television 160.

The PIP window 320 may be described and/or located by a plurality of description registers, including top line register (PIPT), horizontal line register (PIPH), the left edge register (PIPL), and width register (PIPW). The PIPT register may indicate the location of the top line while the PIPH register indicates the number of horizontal lines in the PIP window 320. The PIPL and PIPW registers may define the left edge and width (e.g., in memory words), respectively, of the PIP window 320.

With the PIPSRC set to 1, the port 302 may capture data for the active area 318 that correspond to the dimensions in memory 311. But the memory interface 311 may discard data it captures from the port 302 having write addresses that correspond to the PIP window 320. The port 304, on the other hand, captures data into the memory 310 having addresses that correspond to the PIP window 320. Although the port 304's origin can be translated relative to the port 302's origin, the port 304 uses the same frame memory (and dimensions) as the port 302 in PIP mode. Put differently, the memory interface 311 discards data it captures from the port 304 having write addresses outside the PIP window 320. Note the PIP window 320 need not match the active area 318 of the port 304's image.

During data capture, the ports 302 and 304 may write data to the memory 310 under the control of the memory interface 311 asynchronous to any clocks, e.g., graphics, video, or memory clocks.

The scalar 316 receives image data that includes the PIP window 320 image data pre-inserted through a plurality of first-in first-out (FIFO) line buffers. The scalar 316 scales the image data as a whole, including the active area 318 and PIP window 320 image data. The scalar 316 may be frame-locked to either the ports 302 and 304 (or neither), but may use separate control signaling from that used by the ports 302 and 304. A person of reasonable skill knows well the design and operation of the scalar 316. We will not discuss it in any further detail here.

FIGS. 4A-E are illustrations of a TV 160's display as the user changes channels using an embodiment of a channel change PIP circuit and method. FIGS. 4A-E show the available broadcast signals as those corresponding to channels 2, 6, 8, and 10. FIGS. 4A-E show a channel change sequence that substantially corresponds with the sequence shown in FIGS. 1A-D, except that FIGS. 4A-E show how the inventive channel change system and method described here improves the channel changing experience for the user.

FIG. 5 is a flowchart of an embodiment of a channel change method 500.

Referring to FIGS. 4A-E and 5, the user may manually activate channel change PIP mode at block 502 by, e.g., configuring the television 160's on screen display (OSD) capabilities using the remote control 162. Alternatively, the processor 312 may automatically activate channel change PIP mode by, e.g., setting one of the plurality of registers 313 in the controller 150.

Figure 4A:
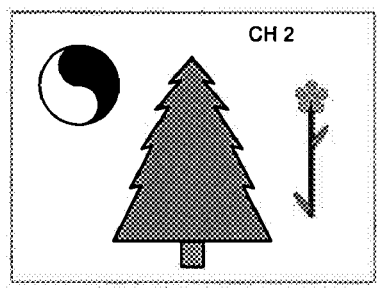

The channel change mode allows the controller 150 to operate the television 160 as follows. FIG. 4A is a display of the user's current channel 2 selection in the active area 318 of the television 160 (block 504).

Figure 4B:
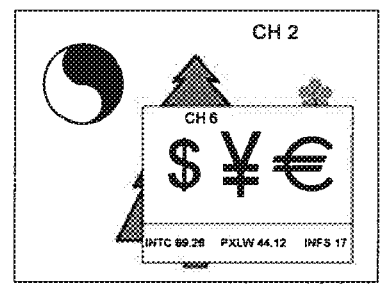
Figure 4C:
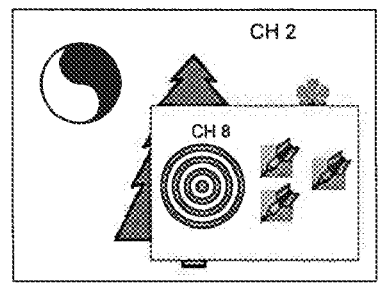
Figure 4D:
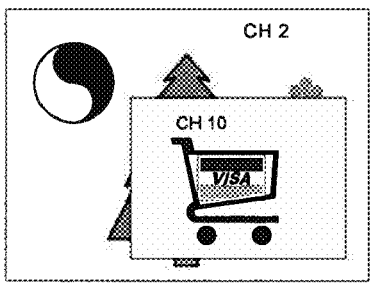

With the channel change mode activated, the controller 150 determines if the user presses a channel change button 164 on the remote control 162 (block 506). If the user presses a channel change button, the controller 150 causes the television 160 to continue to to display channel 2 in the active area 318 (block 508) and channel 6 in the PIP window 320 at block 510 (FIG. 4B). After the user presses the channel change button 164 again (block 506), the controller 150 causes the television 160 to display channel 2 in the active area 318 as before (block 508). But the controller 150 causes the television 160 to replace channel 6 with a display of channel 8 in the PIP window 320 at block 510 (FIG. 4C). After the user presses the channel change button 164 once again (block 506), the controller 150 causes the television 160 to display channel 2 in the active area 318 (block 508). And the controller 150 causes the television 160 to replace a display of channel 8 with a display of channel 10 in the PIP window 320 at block 510 (FIG. 4D).

The user may cancel the channel change mode and/or the PIP mode, using the remote control 162 and/or the television 160's OSD. If the user cancels the channel change mode and/or the PIP mode at block 12, the controller 150 removes the display of the PIP window 320 on the television 160 at block 514 continuing to display the currently selected channel in the active area 318.

Figure 4E:
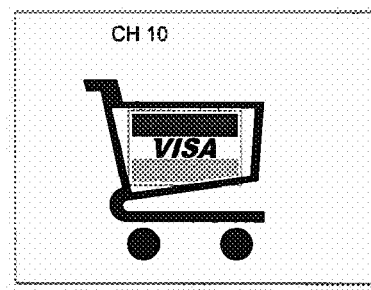

If the user selects to view a channel currently being previewed in the PIP window 320 e.g., channel 10, at any time by pressing a corresponding select button on the remote control 162 (block 516), the controller 150 replaces a display of channel 2 with a display of channel 10 in the active area 318 at block 518 and removes the preview display of the changed channel in the PIP window 320 at block 520 (FIG. 4E). Alternatively, if the user does not change channels within a predetermined time, e.g., 1 minute or less, the controller 150 may remove the display of the PIP window 320 on the television 160 and/or replace the display of the current channel in the active area 318 with a display the channel currently previewed in the PIP window 320.

We have illustrated and described the principles of a television channel change picture-in-picture circuit and method by way of illustrative and not restrictive examples. Those of skill in the art will recognize certain modifications, permutations, additions, and sub-combinations to the exemplary embodiments we describe above. We intend that the following claims and those claims we introduce later be interpreted to include all such modifications, permutations, additions, sub-combinations as are within the spirit and scope.

I claim:

1. A television system, comprising:
    a receiver for receiving an analog image data signal from a source and converting the analog image data signal into first and second digital video signals corresponding to first and second channels, respectively;
    a controller for manipulating the first and second digital video signals, the controller comprising:
        first and second ports for receiving, respectively, the first and second digital video signals from the receiver;
        a frame memory for storing data pixels from the first and second digital video signals; and
        a memory interface for controlling the frame memory, the memory interface comprising a picture-in-picture (PIP) source register (PIPSRC), a PIP enable register (PIPEN), a top line register (PIPT), a horizontal line register (PIPH), a left edge register (PIPL), and a width register (PIPW); and
    a panel for receiving the data pixels from the controller, wherein the panel comprises:
        a primary screen to display data pixels from the first video signal; and
        a secondary screen within the primary screen to display data pixels from the second video signal, wherein the PIPT indicates a location of a top line of the secondary screen, the PIPH indicates a number of horizontal lines within the secondary screen, the PIPL defines a left edge of the secondary screen, and the PIPW defines a width of the secondary screen.

2. The television system of claim 1, wherein the panel comprises a digital display having a fixed pixel structure.

3. The television system of claim 1, wherein the panel comprises an analog display.

4. The television system of claim 1, wherein the controller further comprises first and second input buffers for accumulating the data pixels from the first and second digital video signals, respectively, received by the first and second ports, respectively.

5. The television system of claim 1, wherein at least one of the first and second digital video signals is of a composite video format.

6. The television system of claim 1, wherein at least one of the first and second digital video signals is of a component video format.

7. The television system of claim 1, wherein the controller further comprises a scalar for scaling at least some of the data pixels prior to the controller sending the data pixels to the panel.

8. The television system of claim 1, wherein the controller further comprises a processor for setting the PIPEN.

9. A method, comprising:

displaying a first video broadcast channel on a primary portion of a screen;

responsive to a user pressing a channel change button, changing from the first video broadcast channel to a second video broadcast channel; and responsive to the changing and to receiving an indication from a picture-in-picture (PIP) source register (PIPSRC), defining a secondary portion of the screen based on a top line register (PIPT), a horizontal line register (PIPH), a left edge register (PIPL), and a width register (PIPW), displaying the second video broadcast channel on the secondary portion of the screen while continuing to display the first video broadcast channel on the primary portion of the screen, wherein the secondary portion of the screen is smaller than the primary portion of the screen, and wherein displaying the second video broadcast channel on the secondary portion of the screen is also responsive to receiving an indication from a PIP enable register (PIPEN).

10. The method of claim 9, further comprising setting the PIPEN.

11. The method of claim 9, further comprising scaling image data corresponding to at least one of the first and second video broadcast channels.

12. The method of claim 9, further comprising changing a resolution of image data corresponding to at least one of the first and second video broadcast channels.

13. The method of claim 9, further comprising receiving the first video broadcast channel through a first port in a controller.

14. The method of claim 13, further comprising receiving the second video broadcast channel through a second port in the controller.

15. The method of claim 9, further comprising:

responsive to the user pressing a select button, replacing the first video broadcast channel with the second video broadcast channel on the primary portion of the screen; and removing the secondary portion of the screen.

16. The method of claim 9, further comprising removing the secondary portion of the screen after a predetermined amount of time.

17. The method of claim 16, further comprising replacing the first video broadcast channel with the second video broadcast channel on the primary portion of the screen prior to removing the secondary portion of the screen.

18. The method of claim 16, wherein the predetermined amount of time is one minute.

\* \* \* \* \*

UNITED STATES PATENT AND TRADEMARK OFFICE
CERTIFICATE OF CORRECTION

| | | |
|---|---|---|
| PATENT NO. | : 7,825,989 B1 | Page 1 of 1 |
| APPLICATION NO. | : 12/426865 | |
| DATED | : November 2, 2010 | |
| INVENTOR(S) | : Robert Y Greenberg | |

It is certified that error appears in the above-identified patent and that said Letters Patent is hereby corrected as shown below:

Column 5, line 41, the words "to to" should be replaced with -- to --.

Signed and Sealed this
Fourteenth Day of August, 2012

David J. Kappos
*Director of the United States Patent and Trademark Office*